(12) United States Patent
Coles et al.

(10) Patent No.: US 8,330,931 B2
(45) Date of Patent: Dec. 11, 2012

(54) FLEXOELECTRO-OPTIC LIQUID CRYSTAL DEVICE

(75) Inventors: Harry J. Coles, Cambridge (GB); Marcus J. Coles, Cambridge (GB); Benjamin J. Broughton, Cambridge (GB); Stephen M. Morris, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 1349 days.

(21) Appl. No.: 11/631,130

(22) PCT Filed: Jul. 4, 2005

(86) PCT No.: PCT/GB2005/002630
§ 371 (c)(1),
(2), (4) Date: Dec. 28, 2007

(87) PCT Pub. No.: WO2006/003441
PCT Pub. Date: Jan. 12, 2006

(65) Prior Publication Data
US 2009/0167970 A1   Jul. 2, 2009

(30) Foreign Application Priority Data
Jul. 2, 2004   (GB) .................................. 0414882.1

(51) Int. Cl.
*C09K 19/02* (2006.01)
*G02F 1/1335* (2006.01)
*G02F 1/1343* (2006.01)

(52) U.S. Cl. ............................ 349/185; 349/18; 349/141
(58) Field of Classification Search .................... 349/18
See application file for complete search history.

(56) References Cited

U.S. PATENT DOCUMENTS
2002/0076161 A1   6/2002   Hirabayashi et al.
2004/0012836 A1   1/2004   Li
2005/0041197 A1*  2/2005   Ionescu ......................... 349/185

FOREIGN PATENT DOCUMENTS
EP   0281341 A2      9/1988
GB   2356629 A       5/2001
WO   WO0031582       6/2000
WO   WO2004/021073 A1  3/2004

OTHER PUBLICATIONS

Yamazaki et al., "4×4 Free Space Optical Switching Using Real-Time Binary Phase-Only Holograms Generated by a Liquid Crystal Display", Optics Letters, vol. 16, No. 18, Sep. 15, 1991, pp. 1415-1417.

(Continued)

*Primary Examiner* — Wen-Ying P Chen
(74) *Attorney, Agent, or Firm* — O'Keefe, Egan, Peterman & Enders LLP

(57) ABSTRACT

A device for controlling the polarization state of transmitted light comprises first and second cell walls enclosing a layer of a chiral liquid crystal material. The material has a uniformly orientated helical axis in the absence of an applied field, and electrodes for applying an electric field substantially normal to the helical axis. An applied electric field flexoelectrically couples to the molecules, causing distortion of the helical structure and hence changes the bulk birefringence of the cell.

32 Claims, 16 Drawing Sheets

OTHER PUBLICATIONS

Crossland et al., "Holographic Optical Switching: The "Roses" Demonstrator", Journal of Lightwave Technology, vol. 18, No. 12, Dec. 2000, pp. 1845-1854.

Parker et al., "Dynamic Digital Holographic Wavelength Filtering", Journal of Lightwave Technology, vol. 16, No. 7, Jul. 1998, pp. 1259-1270.

Rumbaugh et al., "Polarization Control for Coherent Fiber-Optic Systems Using Nematic Liquid Crystals", Journal of Lightwave Technology, vol. 8, No. 3, Mar. 1990, pp. 459-465.

Ohtera et al., "Liquid Crystal Rotatable Waveplates", IEEE Photonics Technology Letters, vol. 8, No. 3, Mar. 1996, pp. 390-392.

Chiba et al., "Polarization Stabilizer Using Liquid Crystal Rotatable Waveplates", Journal of Lightwave Technology, vol. 17, No. 5, May 1999, pp. 885-890.

Meyer, "Piezoelectric Effects in Liquid Crystals", Physical Review Letter, vol. 22, No. 18, May 5, 1969, pp. 918-921.

Patel et al, "Flexoelectric Electro-Optics of a Cholesteric Liquid Crystal", Physical Review Letter, vol. 58, No. 15, Apr. 13, 1987, pp. 1538-1540.

Patel et al., "Fast Linear Electro-Optic Effect Based on Cholesteric Liquid Crystal", J. Appl. Phys. vol. 66, No. 4, Aug. 15, 1989, pp. 1879-1881.

Coles, "Chiral Nematics: Physical Properties and Applications", The Handbook of Liquid Crystals, Chapter 2, Wiley-VCH, 1998, pp. 335-409.

Dupont et al., "Principle of a Compact Polarisation Mode Dispersion Controller Using Hometropic Electoclinic Liquid Crystal Confined Single Mode Fibre Devices", Optics Communcations, vol. 176, 2000, pp. 113-119.

Acharya et al., "In-Fiber Nematic Liquid Crystal Optical Modulator Based on In-Plane Switching With Microsecond Response Time", Applied Physics Letters, vol. 81, No. 27, Dec. 30, 2002, pp. 5243-5245.

Dupont, "Endless Smectic A Liquid Crystal Polarization Controller", Optics Communications, vol. 209, 2002, pp. 101-106.

Musgave, B., PhD Thesis, University of Southampton, 1996, Ch. 6, pp. 1-47.

Coles et al., "The Effect of the Molecular Structure on Flexoelectric Coupling in the Chiral Nematic Phase", The Royal Society of Chemistry, XP-002344497, 2001, pp. 2709-2716.

Search Report, PCT/GB2005/002630, Dec. 10, 2005, 6 pgs.

* cited by examiner

FLEXOELECTRO-OPTIC LIQUID CRYSTAL DEVICE

FIELD OF THE INVENTION

The present invention relates to liquid crystal devices, notably to liquid crystal devices which function as polarization state controllers useful in telecommunications and other applications, and to methods of using the devices.

BACKGROUND TO THE INVENTION

Liquid crystal materials have been exploited very successfully for use in display applications, but their potential in telecommunications devices for optical fibre systems has only recently become the focus of extensive research[1,2,3,4,5,6,13]. Thermotropic liquid crystals have advantages over conventional electro-optic telecoms materials such as lithium niobate in that they have high birefringence, high optical transparency, low power consumption, non-mechanical operation, and are cheap and simple to manufacture.

The main area in which liquid crystal devices suffer in comparison is their relatively low switching speeds, typically tens of milliseconds. It is for this reason that the more promising liquid crystal telecommunications devices attempt to either utilise faster liquid crystal electro-optic effects than the simple Freedericksz transition, such as ferroelectric and electroclinic effects[13], or address applications which require switching at well below the bit-rate of the system, such as switchable interconnects[1,2] add/drop multiplexers,[3] or polarization control.[4,5,6,11]

The flexoelectro-optic effect[8,9] however, remains unexplored from a telecommunications standpoint, despite being a very fast switching mechanism with linear electric field response and temperature independence over the nematic range in certain materials. This may be because switching of the optic axis purely within the plane of the cell requires careful control of the state of polarization of the light entering the device in order to produce a consistent effect, which is undesirable in a fibre-optic system.

SUMMARY OF THE INVENTION

According to an aspect of the present invention there is provided a device for controlling the polarization state of transmitted light, the device comprising first and second cell walls enclosing a layer of a liquid crystal material having a substantially uniformly aligned helical axis in the absence of an applied field, and electrodes for applying an electric field substantially perpendicular to the helical axis.

In use, the helical axis will be orientated substantially parallel to the direction of light propagation through the device.

A particularly preferred liquid crystal is a chiral nematic (cholesteric) material, and the invention will for convenience be described herein with reference to this preferred embodiment. The invention overcomes some of the problems of prior art devices by aligning the chiral nematic in a Grandjean (planar) texture, with the molecules lying in the plane of the glass walls, and the helical axis top-to-bottom in the cell. Applying the electric field in the plane of the cell (therefore still perpendicular to the helical axis), allows flexo-electric deformation to occur, enabling randomly polarised input light (for example from a fibre) to be converted to any desired output polarization. In a particularly preferred embodiment the pitch length of the chiral nematic helix is substantially shorter than the wavelength of incident light on the device so as to reduce or minimise rotational dispersion effects. In this situation the birefringence of the liquid crystal molecules as experienced by incident light can be expressed as bulk birefringence of the layer. In the case of an undisturbed Grandjean texture with the helical axis in parallel to the propagation direction of incident light this bulk birefringence tends to zero because of the 'full-circle' precession of the molecular directors within the helical structure. By using a helical pitch much less than the wavelength of light, the device may be made substantially insensitive to temperature, because thermal variations of the pitch length will be insignificant compared to the operating wavelength. Operating the cell at a wavelength well away from the reflection band of the chiral nematic, for example in the 1550 nm telecoms window, ensures the light will experience minimal optical activity. When a field transverse to the helical axis is applied to the system, flexoelectric coupling distorts the helix such that bulk birefringence is induced which can be used to control the polarization state of incident light. An in-plane electric field deflects the optic axis from lying along the direction of propagation to having some component in the polarization plane of the light.

To our knowledge, there has been no published work on the transmission effects of flexoelectro-optic director deformation in a Grandjean texture. We have demonstrated the existence of an electro-optic effect in this configuration at telecoms wavelengths and characterised the nature of the effect. The effect is of particular use in a polarization controller, a plain nematic version of which[5,6,12,17] Pi Photonics Ltd are developing and for which the "cartwheel" cells used in the present experimental work were designed.

Theory

According to flexoelectric theory, the shape asymmetry and spontaneous electric dipole of the molecules comprising the liquid crystal means that, when a field is applied, in order for the material to obtain a bulk electric polarization, a splay and/or bend deformation is induced in the material[7], the degree of deformation being proportional to the polarization induced:

$P = e_s S + e_b B$, where P is the dielectric polarization, S and B are the splay and bend deformation vectors, $\hat{n}(\nabla \cdot \hat{n})$ and $\hat{n} \times (\nabla \times \hat{n})$ respectively. In the above equations, $\hat{n}$ is the local nematic director unit vector, and $e_s$ and $e_b$ are the flexoelectric coefficients for splay and bend respectively.

In a chiral nematic, if the field is applied perpendicular to the helical axis, a combination of splay and bend can be achieved by a deformation of the helices that the director forms, so that the molecules lie in a Bouligand cut plane[8]. This is illustrated in FIG. 1.

As the optic axis of the material is always perpendicular to the long axis of the molecules, this deformation causes a rotation of the optic axis perpendicular to both the applied field and the helical axis of the material. For a standard cell with the field applied between the glass plates, containing a chiral nematic in the ULH texture, this gives a rotation of the optic axis in the plane of the cell. The degree of rotation is given by:

$$\tan\phi = \frac{e}{Kk} E \qquad (1)$$

where k is the helical wavevector $k = 2\pi/P$ (P=helical pitch), and E is the applied field, K is the average of the splay and bend elastic constants; $k_{11}$ and $k_{33}$ respectively, and e is the average of the flexoelectric coefficients. The figure of merit for a flexoelectric material is therefore e/K, the ratio of the average flexoelectric coefficients to the average elastic constants, or flexo-elastic ratio. For a fuller description of this effect see [8].

This effect has been subject to a great deal of interest, both in potential devices, and in materials optimisation,[15] as the characteristic switching times are small (tens of microseconds) and the deflection of the optic axis is linearly proportional to the applied field, and can be roughly independent of temperature over the nematic range. Also, a device placed between crossed polarizers with an optic axis tilt angle of 22.5°, and thickness such that the cell is a half waveplate would give 100% modulation of the incident light.

The central idea of the device proposed here however, is to rotate the geometry of the chiral nematic and the field direction within the cell, such that the application of a field now deflects the optic axis according to equation (1), but with the field in the plane of the cell, such that the optic axis moves from lying in the direction of propagation (zero birefringence) to lying at the flexoelectric tilt angle, and therefore having some component perpendicular to the direction of propagation, inducing a birefringence. This allows the cell to be aligned in the much more reliable Grandjean (standing helix) texture, rather than the ULH. If the cell is illuminated in the infra-red, the optical activity of a typical short pitch chiral nematic will be minimal, so the switched device will act as a straightforward fractional waveplate. The proposed cell geometry is illustrated in FIG. 2. It should be noted that although electrodes are shown on either side of the cell, the field in FIG. 2 is directed in the y direction into the page.

As the optic axis of the switched cell will have a component that remains in the direction of propagation (unless the tilt angle is 90°) the cell will also act as a walk-off plate due to double refraction, but the lateral translation of the beam should be minimal in a 10 µm thick cell.

The rotation of linearly polarised light propagating along the helical axis of a chiral nematic is given by:

$$\frac{\psi}{d} = \frac{\pi}{16}\left(\frac{n_\parallel^2 - n_\perp^2}{n_\parallel^2 - n_\perp^2}\right)\frac{P^3}{\lambda^2(P^2 - \lambda^2)} \quad (2)$$

where $\psi$ is the rotation angle, P is the helical pitch, d is the cell thickness, and $n_\parallel$ and $n_\perp$ are the microscopic refractive indices parallel and perpendicular to the director respectively. For typical values of the refractive indices, a pitch of 500 nm and 1550 nm light, this gives a rotation of approximately 0.2° in a 10 µm thick cell. Optical rotation can therefore be ignored, and the linearly polarised light can be considered to experience a refractive index which varies sinusoidally from $n_\perp$ to $n_\parallel$, with the pitch of the helix, on progression through the cell, regardless of initial polarization direction.

The source of the electrically induced birefringence can be illustrated by considering the cross-section of the helix in the plane perpendicular to the direction of propagation (FIG. 3). Without an applied field, the rotation of the undeflected director traces out a full circle, under an applied field, the directors which lie with their axes perpendicular to the field are tilted out of the plane, reducing their component in the x direction. The directors that lie with their long axis parallel to the field meanwhile are simply rotated about their long axis, resulting in no change to the value of the indicatrix acting on the light for this direction of polarization. The "full circle" precession of the director on propagation through the cell is then compressed in the direction perpendicular to the applied field to form an ellipse, and a birefringence results. The theoretical changing refractive index for light polarized in the x direction, on progression through the cell, with and without an applied field, is shown in FIG. 4.

The magnitude of the birefringence induced in the cell is then given by the difference in the average refractive indices parallel and perpendicular to the applied field:

The equation for transmission of light through crossed polarizers with a birefringent material is:

$$\frac{I}{I_0} = \sin^2(2\psi)\sin^2\left(\frac{\Delta nd}{\lambda}\pi\right) \quad (3)$$

where $I/I_0$ is the fraction of incident intensity transmitted, $\psi$ is the angle between the optic axis of the material and the polarizer, and $\lambda$ is the wavelength of the incident light. This equation gives zero transmission for any retardance if the optic axis is parallel to either of the polarizers, and maximum transmission with the optic axis at 45' to the polarizers and the retardance equal to half a wavelength. A preliminary analysis of the expected transmission of a chiral nematic through crossed polarizers, for a given tilt angle, was performed using Jones matrix representation of the projection of the refractive indicatrix ellipsoid in the plane of polarization. This projection was calculated for rotations of the ellipsoid from flexo-electro-optic theory, for estimated infra-red refractive indices and an average pitch length of 500 µm, the result being shown in FIG. 11.

If we take the Δn predicted by FIG. 11, for a 4 V/µm bipolar triangular wave, and the typical material parameters used above, and assume an induced optic axis angle with component in the plane of the cell at $\psi$=45° to the polarizers and a cell thickness of 10 µm, an electro-optic response is predicted as shown in FIG. 5.

FIG. 5 shows the anticipated frequency doubled response caused by the metronomic action of the optic axis in the bipolar field, going through the optically neutral vertical position twice per cycle at 0 V/µm. It also shows a very small predicted response (8% total modulation) due to the small induced birefringence. It is this response the device ought to produce, although FIG. 5 is idealised as it takes no account of the material response time.

The device of the present invention can be used as a fast, endlessly rotatable waveplate for polarization mode dispersion compensation, notably in optical fibre systems. The device may function as any desired wave plate, for example as a quarter-wave plate or a half-wave plate in any direction. Applications include optical routers and drop muliplexers. Unlike prior art devices, which are polarization-sensitive, the device of the present invention is insensitive to input light polarization and, because the pitch may be adjusted, can be optimized for any desired input wavelength.

According to another aspect of the invention there is provided an optical router comprising:
 a) a cell comprising first and second cell walls enclosing a layer of a chiral nematic (cholesteric) or chiral tilted smectic liquid crystal material having an optic axis substantially normal to the inner surfaces of the cell walls in the absence of an applied field, and a plurality of electrodes arranged around a light-input region of the liquid crystal layer, each electrode being selectively addressable to apply a transverse electric field across said light-input region, whereby said electric field may be applied in any of a plurality of selectable directions substantially parallel to the inner surfaces of the cell walls;
 b) a light source arranged to direct light through said light-input region via said first cell wall; and c) a plurality of light output carriers each of which is arranged and adapted to receive light from said light-input region via said second cell wall when said light is of a specified state and/or direction of polarization, said specified state and/or direction being different for each light output carrier.

There are preferably at least four electrodes, but any desired number may be employed, for example, six, eight, or ten, depending on the number of outputs required.

The light output carriers may comprise optical fibres for connection to different devices or components. The light source may comprise an optical fibre coupled to a light emitter of suitable wavelength range, notably the telecommunications range from about 1530 nm to about 1563 nm.

Other aspects and benefits of the invention will appear in the following specification, drawings and claims.

BRIEF DESCRIPTION OF THE DRAWINGS

The invention will now be further described, by way of example, with reference to the following drawings in which.

DETAILED DESCRIPTION

Sample Preparation

Figure 1:
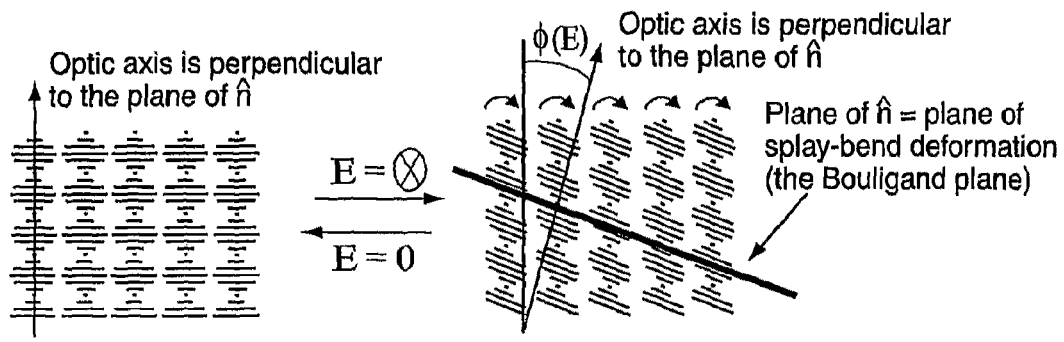
FIG. 1 illustrates deformation of the helix of a chiral nematic in order to allow the molecules to lie in the Bouligand cut plane causing the optic axis to rotate by an angle $\phi$.
Figure 2:
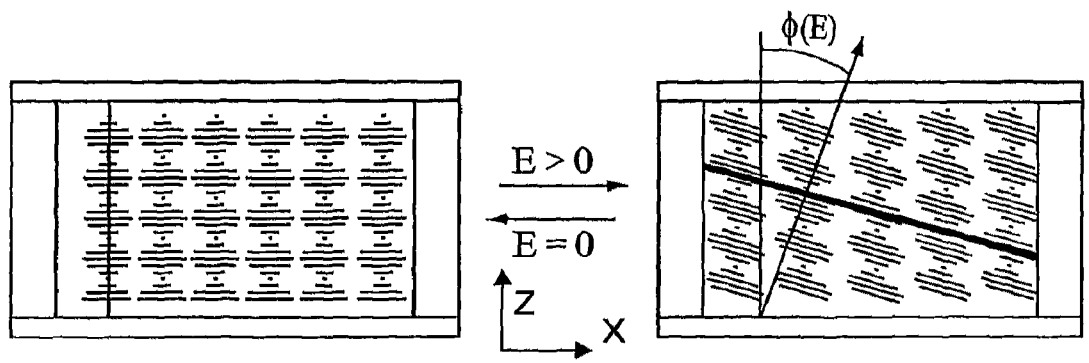
FIG. 2 shows the flexoelectro-optic effect with the chiral nematic in a Grandjean texture, with light propagation along the helical axis, and an applied field in the plane of the cell.
Figure 3:
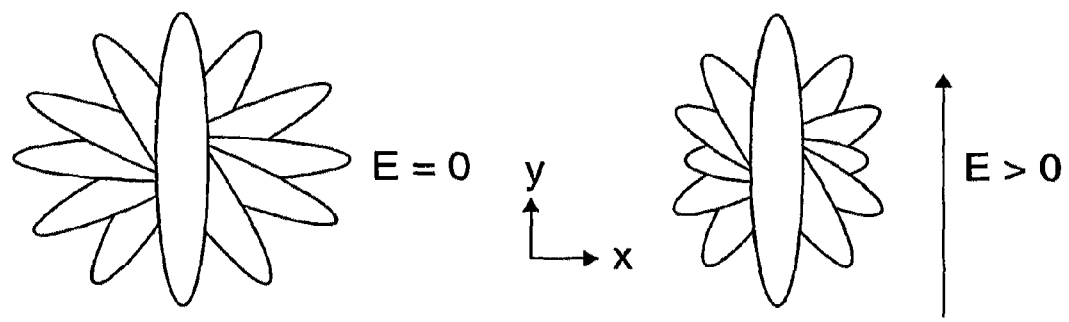
FIG. 3 is a cross section of the helix in the x-y plane in an initial state and a deformed state.
Figure 4:
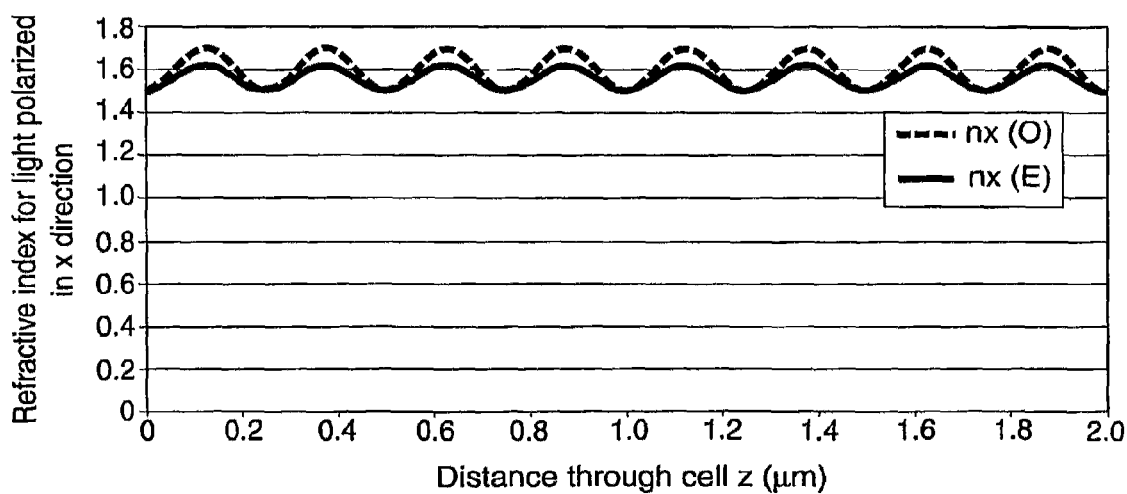
FIG. 4 shows the expected refractive index profile along the direction of propagation for a material with $n_\perp=1.5$, $n_\parallel=1.7$ and pitch length 500 nm, with and without an applied field.
Figure 5:
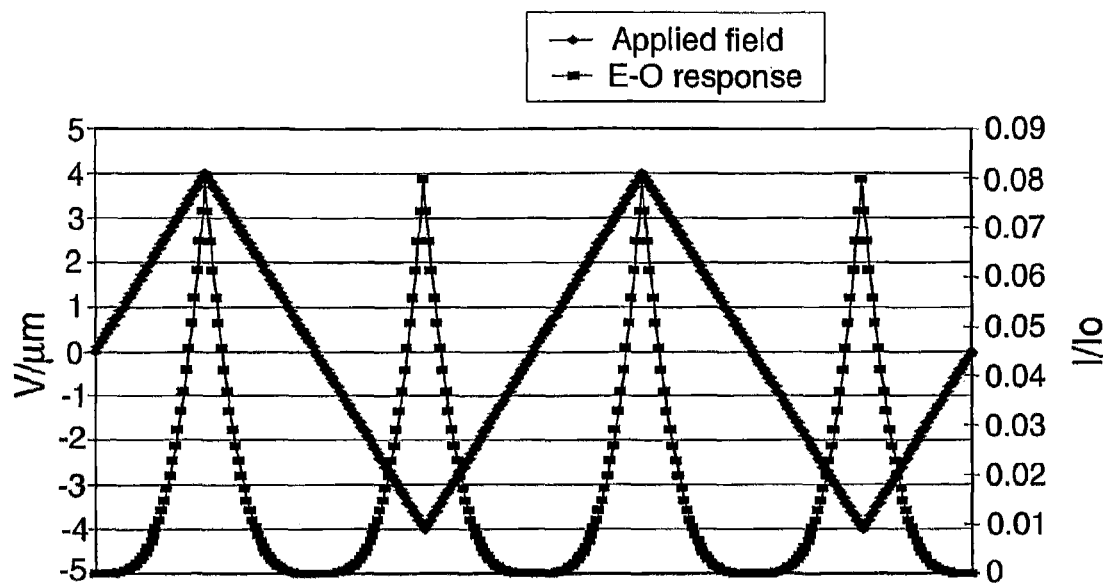
FIG. 5 graphs the predicted electro-optic response of the Grandjean flexoelectric effect to a 4 V/μm bipolar triangular wave, given typical material parameters, according to equations (9) and (10)
Figure 6:
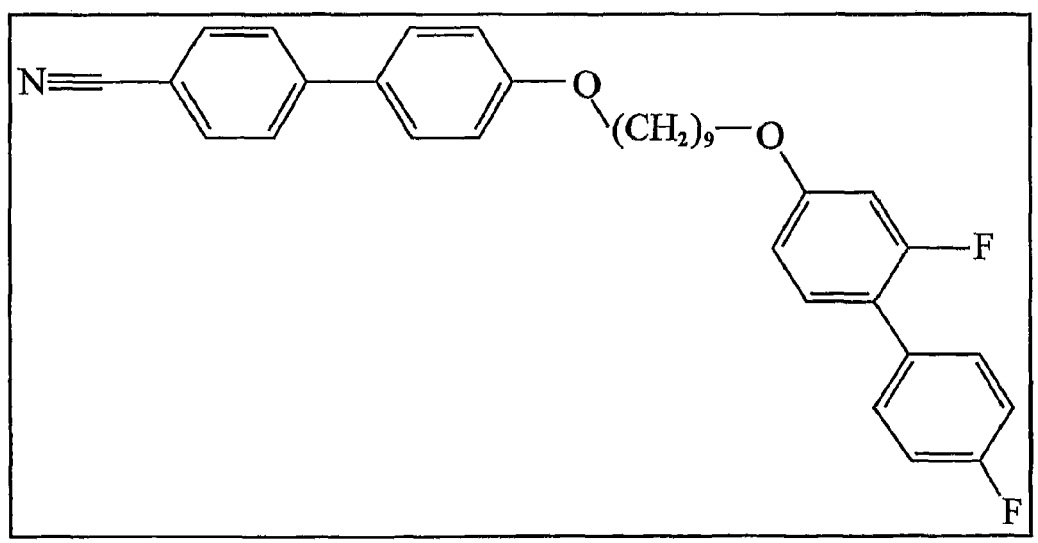
FIG. 6 gives the chemical structure of the non-symmetric bimesogen α-(2',4-difluorobiphenyl-4'-yloxy)-ω-(4-cyanobiphenyl-4'-yloxy)nonane (known as FFO-9-OCB)

Three separate chiral nematic mixtures were prepared and tested. The first two of these consisted of the non-symmetric bimesogen α-(2',4-difluorobiphenyl-4'-yloxy)-ω-(4-cyanobiphenyl-4'-yloxy)nonane (known as FFO-9-OCB), whose structure is shown in FIG. 6, and was synthesised in-house specifically for its optimised flexoelectric characteristics of large flexo-elastic ratio and low dielectric anisotropy[14]. It has been shown that far greater flexoelectric coupling effects can be seen in liquid crystal systems based on bismesogenic liquid crystal compositions 6. The FFO-9-OCB was mixed with the high twisting power chiral dopant BDH1281 (Merck NB-C) in proportions of 2% w/w and 3% for the first and second mixtures respectively. The third mixture consisted of 4-heptyl-alkyloxy-4'-cyanobiphenyl (7OCB), whose structure and flexoelectro-optic properties are well known[15], and 3% (w/w) BDH1281, and was intended as a control mixture. Each of these mixtures were heated into the isotropic phase for a period of 24 hours in order to allow complete mixing, and were capillary-filled into the test cells in the isotropic phase. The mixtures were each phase characterized using polarizing microscopy and their reflection band in the N* phase measured using a UV-Visible spectrophotometer. This can be used to estimate the pitch length of the material, taking an approximate average refractive index of 1.6, and was found to give pitches of 485 nm, 300 nm, and 410 nm respectively for the mixtures as ordered above.

Figure 7:
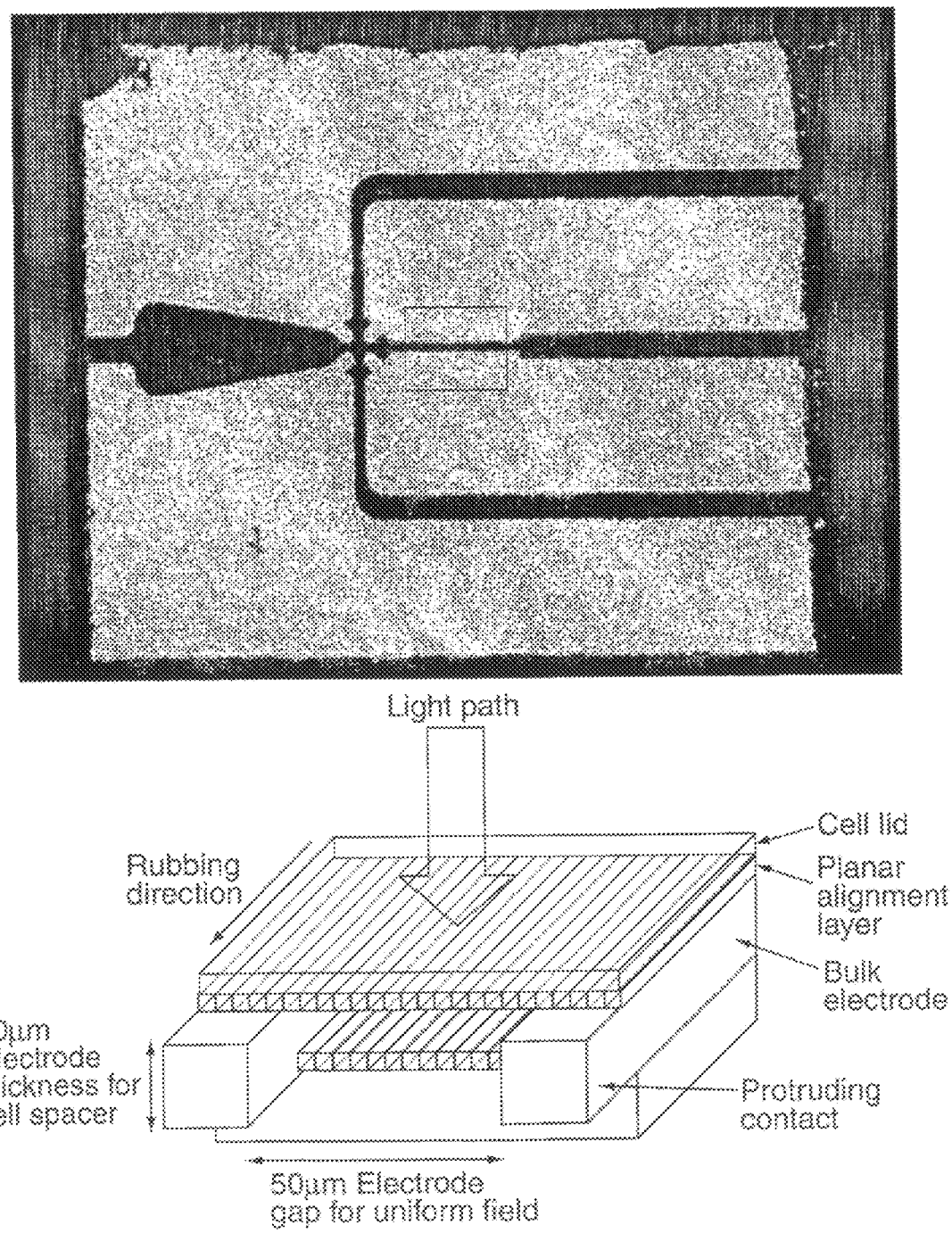
FIG. 7 is a photograph of a Pi Photonics cartwheel cell showing its electrode pattern, with the active region shown in a central box, and a schematic of the device geometry.

The test cells were manufactured by Pi Photonics Ltd for development of a homeotropically aligned nematic rotating waveplate. With this purpose, they were designed with 4 electrodes converging on a 50 μm diameter active area, such that by varying the voltage on all four electrodes, the field in the centre of the active region could be applied in any direction in the plane of the cell, and the optic axis rotated to the desired azimuth. The electrode layout of the cell can be seen in FIG. 7.

For these initial experiments, this freedom is not required, and the field is applied solely between the two central electrodes, and the probe beam is directed in the narrow (50 μm) portion of the channel between these, which appears boxed in the figure. This allows maximum confidence in the uniformity of the field. The electrodes are deposited gold, 10 µm thick, and also act as spacers onto which to glue the lid of the cell and define its thickness.

The cell is spin-coated with a 1% solution in water of PVA which is then evaporated to deposit an alignment layer promoting planar orientation of the nematic director. The layer cannot be rubbed however due to the presence of the electrodes, so although the liquid crystal molecules are made to lie flat in the cell, there is no preferential direction for their orientation within the plane of the cell. A lid consisting of a 2 mm² cleaved section of microscope cover slip 100 µm thick is placed onto the cell, having been coated with an alignment of unidirectional rubbed PTFE. This is found to provide a more reliable alignment and superior texture than PVA. The lid is then fixed to the cell utilising capillary action to draw the UV curing glue over the electrodes without filling the channels, and exposing to set. With the lid fixed, the chiral nematic can itself be capillary filled through the channels to fill the cell, and then the cell sealed with a second application of glue around the edges of the lid. A polarizing microscope is then used to verify the presence of the required Grandjean texture when the cell is brought into the chiral nematic range.

Experimental

The filled and sealed cell is then placed into a probe station which uses micrometer screws to clamp contacts onto the four electrodes, and to manoeuvre the position of the cell in the probe beam. The probe station has connections to an amplified signal generator output which allows pulses of varying shape and width, and amplitude up to 400 Vpp, to be applied across the cell. It is also equipped with a heating element and thermometer allowing the cell to be maintained at a specific temperature. The probe beam is a 1550 nm fibre launched DFB laser.

Figure 8:
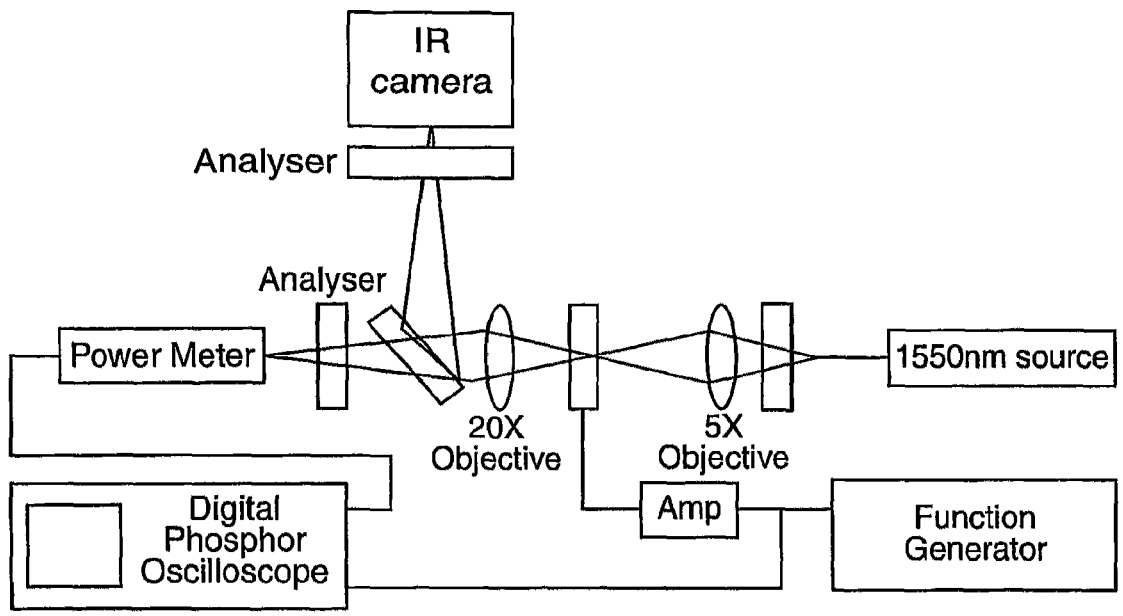
FIG. 8 is a schematic diagram of the experimental setup.
Figure 9:
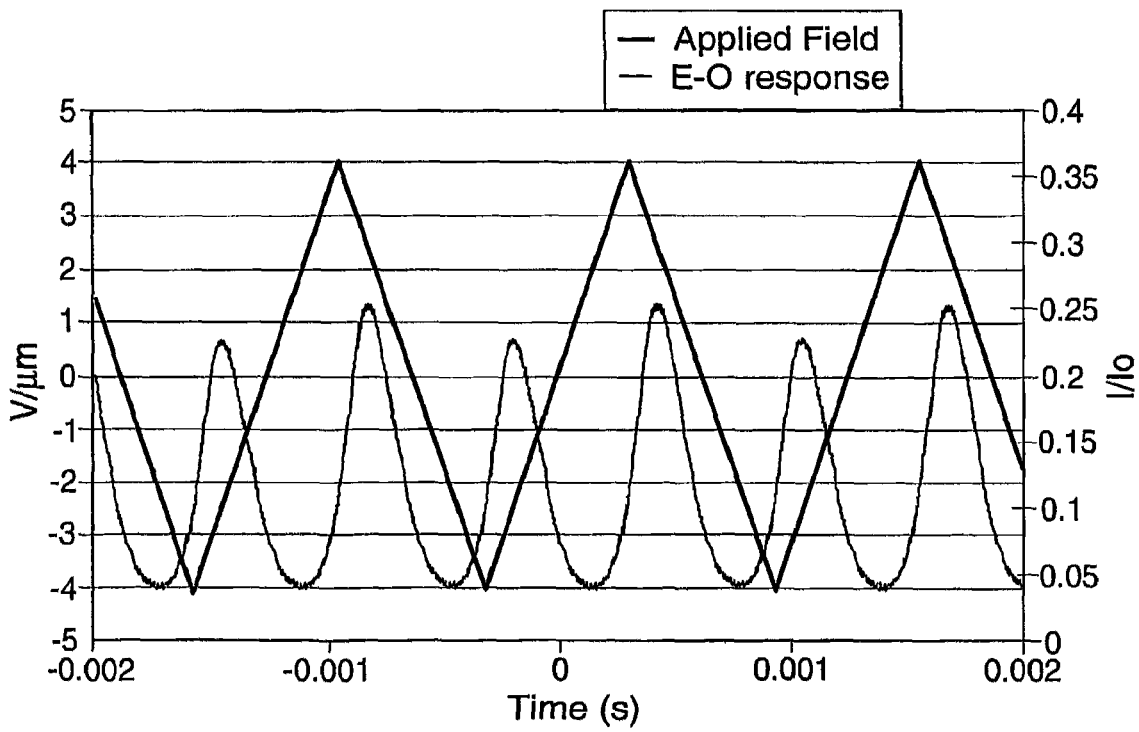
FIG. 9 shows electro-optic response of the cartwheel cell at 1550 nm, driven by a 4 V/μm, 0.8 kHz triangular wave at 110° C.

The cell is placed between crossed polarizers and microscope objective lenses, such that the emerging beam is polarized, focused directly through the relevant portion of the cell, re-collimated through the second orthogonal polarizer and focused into a power meter. The output from the power meter can then be viewed alongside the electronic pulse applied to the cell on a digital phosphor oscilloscope. This arrangement can be seen in FIG. 8.

The output power of the laser is adjusted to give approximately 100 µW total power transmission to the detector with zero field applied to the cell and the second polarizer uncrossed. The power transmission at zero field with the polarizers crossed is also checked and found to be below 5 µW for all polarizer angles, confirming the lack of optical activity and birefringence in the Grandjean texture for the test wavelength. This is provided that there are no birefringent "oily streak" disclinations in the area of the cell sampled by the beam.

The application of a voltage pulse then deforms the helix, tilting the optic axis of the material from lying along the direction of propagation to some component in the plane of the cell, perpendicular to the applied field, inducing a birefringence. A fraction of the incident light is then transmitted through the crossed polarizers, according to equation 4.

$$\frac{I}{I_0} = \sin^2(2\psi)\sin^2\left(\frac{\delta}{2}\right) \quad (4)$$

Where $\psi$ is the angle between the polarizer and the optic axis if the medium and $\delta$ is the phase retardance induced, and is equal to $$\delta = \frac{\Delta n d}{\lambda} 2\pi \quad (5)$$

Where $\Delta n$ is the induced birefringence, d is the thickness of the cell, and $\lambda$ is the probe wavelength. As the polarizers are orientated at 45° to the applied field, this reduces to:

$$\frac{I}{I_0} = \sin^2\left(\frac{\delta}{2}\right) \quad (6)$$

The induced birefringence then can be inferred from the fraction of light transmitted during the pulse. The applied voltage took the form of a bipolar square pulse of 2 ms duration and 5 Hz repetition rate for all measurements, and the response trace used was averaged over 16 pulses. The repetition rate was kept deliberately low, as the application of a continuous bipolar square wave at the equivalent frequency resulted in instabilities in the N* texture, the development and movement of birefringent disclinations, which altered the cell's optical response. At a 5 Hz pulse repetition, however, the Grandjean texture remained very stable, and the cell could be left for several hours without any significant change in the shape or size of the response.

Results and Discussion

Figure 10:
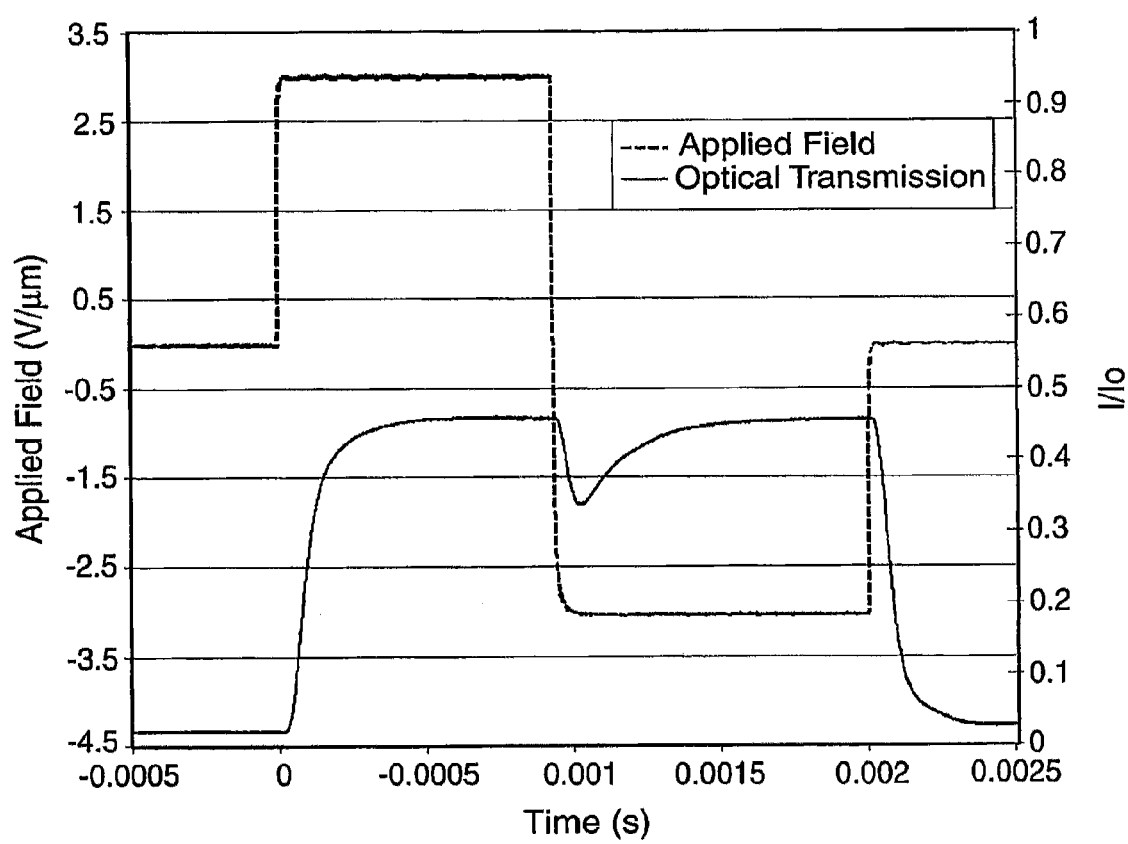
FIG. 10 is a Digital Phosphor Oscilloscope trace showing the applied voltage pulse and consequent probe beam intensity transmission for the cartwheel cell of FIG. 7, containing 7OCB+3% BDH1281 sample at 5° C. below the N*-I transition.

The response from the 7OCB+3% BDH1281 sample at 5° C. below the N*-I transition to a ±3 V/µm 2 ms duration bipolar square is shown in FIG. 10. This shows the characteristic response from the chiral cartwheel cell, the shape of which is common to all the materials tested, and from which the following measurements were taken:
1) The amplitude of the response; normalised for the input power measured and adjusted to give I/I₀.
2) The response times of the effect; as the time interval between the 10% and 90% I/I₀ values for the rise time at the leading edge, and as the 90-10% interval at the trailing edge.

As the figure shows, the response is fast (~100 µs), and is independent of the field direction, although it can be seen from the dip in transmission as the field changes value that the optic axis follows the field as expected from flexoelectro-optic theory, but the transmission is dependent only on the magnitude of the optic axis tilt, not its direction. The flexoelectro-optic axis tilt is given by equation 4, where $\phi$ is the induced tilt angle, e/K is the flexo-elastic ratio and P is the helical pitch of the material.

$$\tan\phi = \frac{2\pi}{P}\frac{e}{K}E \quad (7)$$

Figure 11:
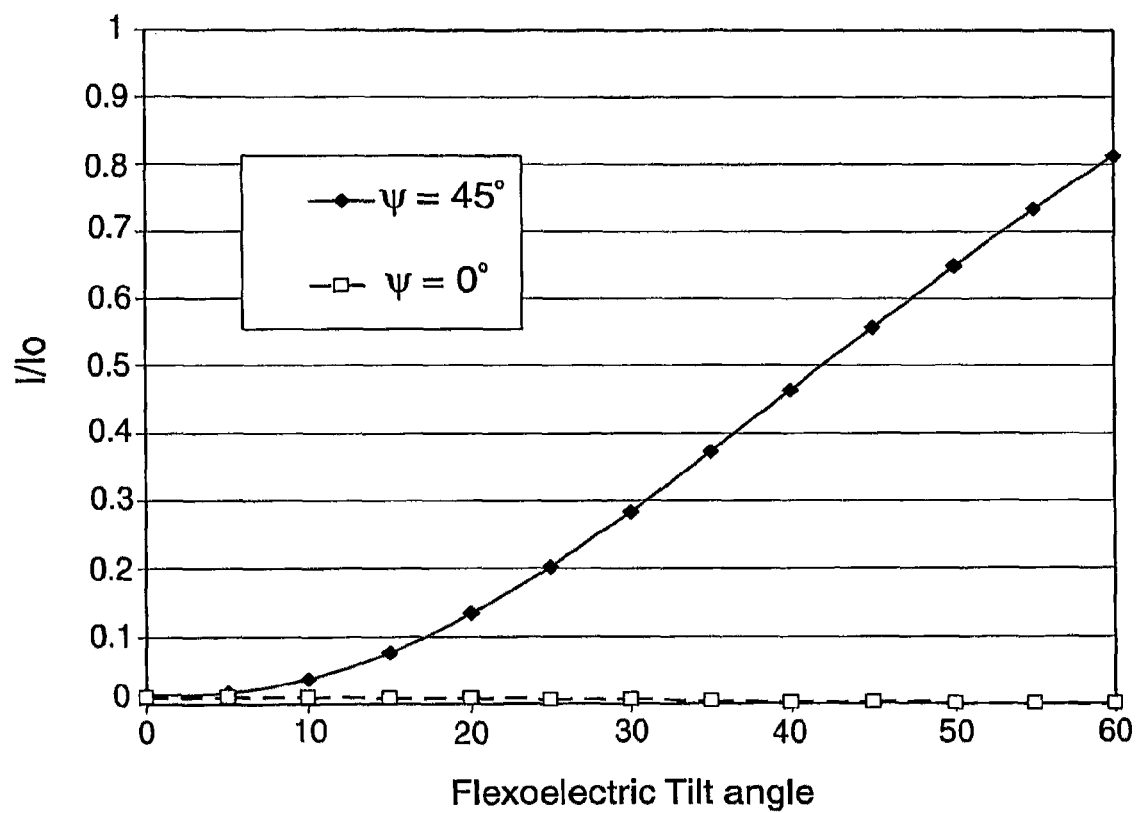
FIG. 11 illustrates the preliminary theoretical dependence of intensity transmission on flexoelectro-optic tilt angle.

The tan function is approximately linear for the range of tilt angles expected, so the transmission of the system will depend on how the effective refractive indices in the polarization plane of the light change for a given tilt angle, which ultimately rests on the shape of the refractive indicatrix. A preliminary analysis of the expected transmission for a given tilt angle was performed using Jones matrix representation of the projection of the refractive indicatrix ellipsoid in the plane of polarisation. This projection was calculated for rotations of the ellipsoid from flexoelectro-optic theory, for estimated infra-red refractive indices and an average pitch length of 500 µm, the result being shown in FIG. 11.

Figure 12:
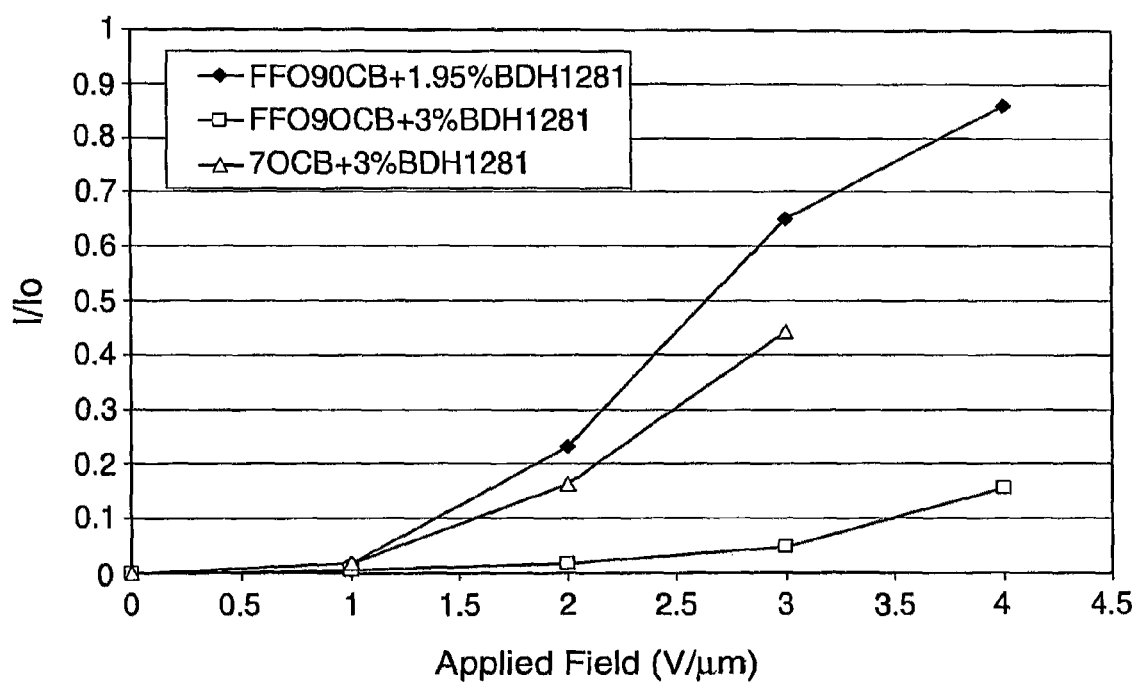
FIG. 12 graphs the fraction of intensity transmitted by the cell of FIG. 7 through crossed polarizers as a function of the applied field for each of three mixtures at 10° C. below their I-N* transition.

The amplitude of the response for all three mixtures for fields of up to 4 V/µm (except for the 7OCB mixture, for which applied fields greater than 3 V/µm caused signal distortion, probably due to dielectric coupling induced helix unwinding, as observed in the ULH flexoelectro-optic measurements[15]), is shown in FIG. 12. The transmission can be seen to increase with increasing pitch length, in accordance with equation 7, but the transmission at high fields for all mixtures is much greater than anticipated, implying tilt angles from the theory of FIG. 11 which are far greater than those measured for the same materials in the ULH texture.

There is no reason to believe the change of alignment conditions causes a greatly increased degree of flexoelectric coupling, so further work need to be carried out to explain this. Principally, definite measurements need to be made of the refractive indices at 1550 nm, the definite pitch length using a Cano wedge cell, and also of the cell thickness of the sealed cell. The large electrode area of the cells used prevents enough light being transmitted through the cell for the thickness to be measured by the standard etalon method in a UV-Visible spectrophotometer. This problem will have to be overcome however in order to gain a definite measure of the induced birefringence, and therefore the implied tilt angle. The fact remains, however, that overall retardation induced in the cell is large enough (>λ/3) to provide good potential for a polarization control device which would require λ/2 retardation at the operating wavelength to provide access to all possible polarization states.

Figure 13:
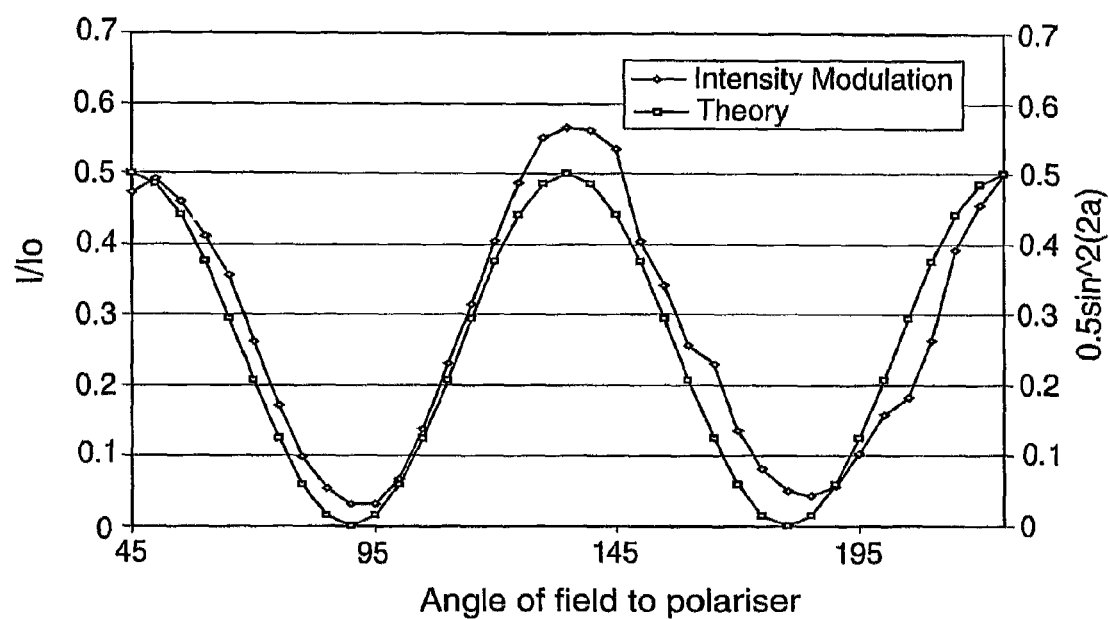
FIG. 13 graphs amplitude of the electro-optic response of the cartwheel cell as a function of the angle of the applied field with respect to the polarizer, compared to theory.

FIG. 13 shows the dependence of the maximum intensity transmitted through crossed polarisers of the device on the angle of the applied field to the polariser. The expected $\sin^2(2\psi)$ response is observed, in accordance with equations 3 and 4.

Figure 14:
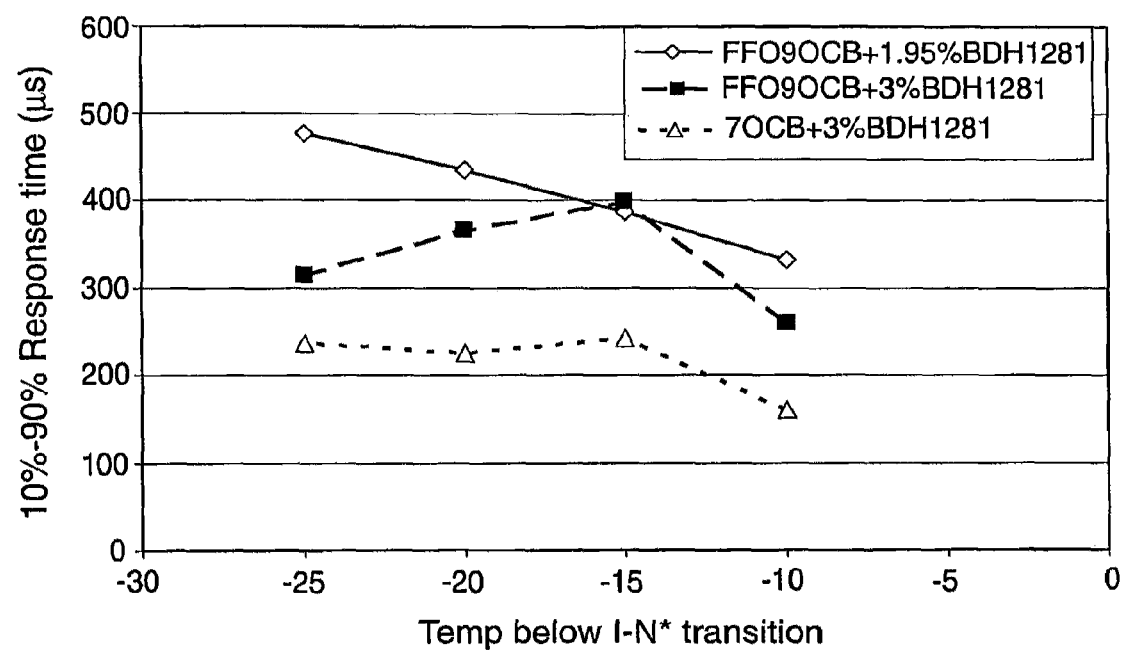
FIG. 14 shows the 10%-90% response times of the three mixtures, upon application of a 3 V/μm field, as a function of temperature below the I-N* transition.
Figure 15:
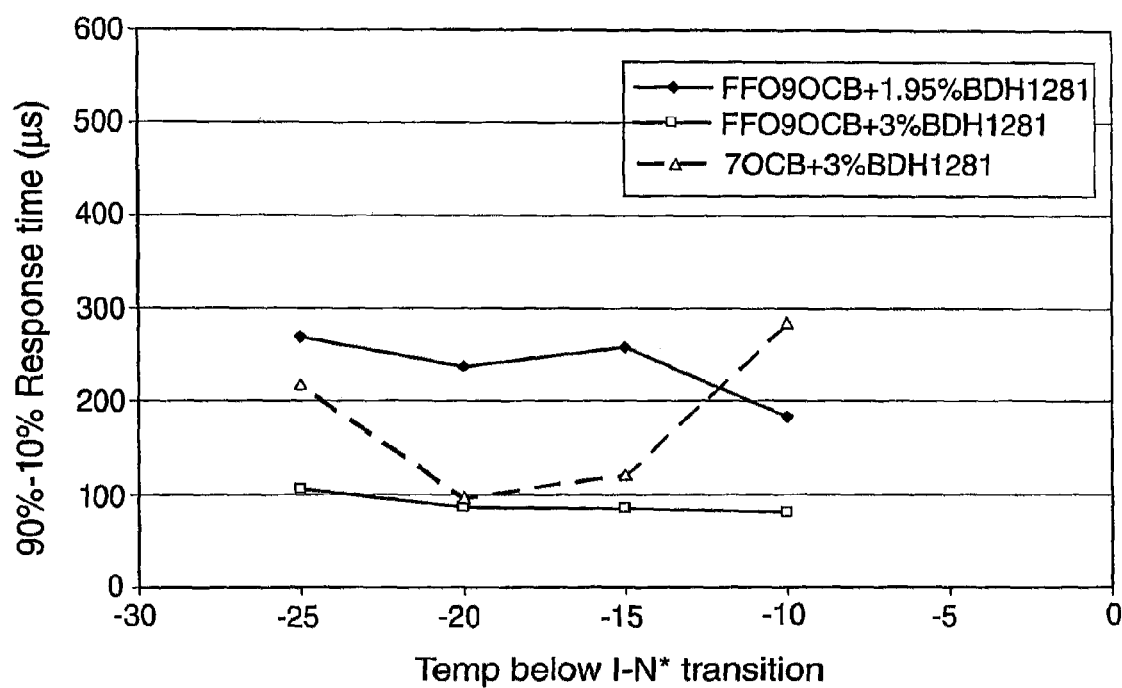
FIG. 15 shows the 90%-10% response times of the three mixtures, upon removal of a 3 V/μm field, as a function of temperature below the I-N* transition.

The response times of the mixtures are shown for application and removal of an applied field at 3 V/µ at a range of temperatures below the I-N* transition in FIGS. 14 and 15 respectively. The response times can be seen to increase with increasing pitch length, and show a slight increase on cooling for all mixtures, as expected. What is interesting to note is that the relaxation times upon removal of a field are generally faster than the response to the application of a field, which is most unusual in liquid crystal effects and to which no explanation can be applied as yet. Generally however, the response times can be seen to be fast-comfortably sub-millisecond, which is encouraging for possible development of a fast response polarization control device for telecommunications wavelengths.

We have shown conclusively that the flexoelectro-optic effect operates with a short-pitch chiral nematic material aligned in the Grandjean texture, and has the ability to induce a birefringence in the material at telecommunications wavelengths where otherwise the conformation would be optically neutral. We have shown that the response time of this effect is fast (~100 µs), in line with expectation from the conventional ULH based flexoelectro-optic effect, but the magnitude of the response, especially in 7OCB, is much greater than expected (δ>2n/3).

Device Application

These experiments were performed with the purpose of demonstrating that with an in-plane field and a Grandjean texture, the optic axis of a chiral nematic with large flexoelectric coefficients can be deflected by some angle into the plane of the cell, the magnitude and direction of the optic axis rotation being dependent on the magnitude and direction of the field. These are the requirements of an endlessly rotatable waveplate, one of the more promising solutions to the problem of polarization mode dispersion (PMD) in optical fibre communication systems. A PMD compensator must be able to take the randomly fluctuating state of polarization (SOP) that is output from a long communication fibre due to the temporary birefringence induced in the fibre by vibrations and temperature changes etc, and convert it with minimal loss into the desired polarization state. This is made possible by a series of three rotating waveplates of π/2, π, and π/2 retardance[11]. Liquid crystals have been utilised to manufacture such devices previously using simple nematic[5,6,12] and faster electroclinic[13] switching mechanisms, but it is desirable to improve either speed or overall retardance in a reliable cell structure in order to offer the most effective solution. It is thought that the Grandjean flexoelectro-optic mechanism demonstrated here may provide these improvements. Three developments are desirable to optimise this novel effect in a commercial device:

1: Increasing the retardance of the device. This may be achieved by increasing the birefringence of the raw material at 1550 nm, by utilising a greater applied field, by using a material with larger tilt angles to access a greater fraction of the available birefringence, or simply by using a thicker cell to increase the optical path length.

2: Rotating the optic axis. This is the function the cartwheel cells are designed for, but these measurements did not utilise the angular spread of the electrodes to apply the field in any direction; the electrodes were paired and the field applied in solely one direction to provide basic demonstration of the effect. In order to rotate the optic axis and measure the maximum angular velocity, the critical test for a PMD compensator, it is desirable that the cell be made more stable to large fields. In a preferred embodiment the texture of the liquid crystal is stabilised by a polymer in order to prevent or reduce flow effects caused by the large non-uniformity of the field outside the active area. Polymer stabilisation increases the viscosity of the liquid crystal medium resulting in a slight increase in response time for the cell, but increases stability, and reliability on temperature cycling, of the Grandjean texture.

3: Optimising the cell for a.c. voltages. The flexoelectro-optic effect is a d.c. effect, i.e. the direction of rotation of the optic axis is dependent on the direction and polarity of the applied field. This means that a d.c. voltage is required to hold the optic axis in a set position. This is undesirable with liquid crystal devices, which normally respond to the r.m.s. of an a.c. field, as d.c. fields result in conduction of impurities in the material and charge build-up which ruins the device. In a preferred embodiment, the device therefore may consist of two or more cartwheel cells back-to-back, which would be driven by identical waveforms, one quarter of a cycle out of phase with each other, the shape of the waveform being such that the sum of the induced birefringence in each of the two cells was constant despite the ticking back and fore of the optic axis in each cell. The direction of the optic axes could then be rotated together or counter to each other to provide the desired effect. This requires some complicated drive electronics, but is certainly feasible for those skilled in the art of electronics. In addition to providing a means for keeping the optic axis static with an a.c. field this arrangement may also allow the assembly to operate faster.

Polymer Stabilisation of the Device

Subsequently to the results shown above, further results were obtained using three more chiral nematic mixtures, each with a small percentage (3-6% w/w) of reactive mesogen RM257 (Merck-NB-C) and photoinitiator Irgacure 819 (1% w/w). This allowed the formation of a stabilising polymer network within the liquid crystal texture by exposure to UV radiation. This network supported takes on the structure of, and hence after cross-linking supports, the liquid crystal texture at the time of UV exposure (in this case, Grandjean). These stabilised mixtures, when used in the cells as above, were found to provide sufficient ruggedness to allow the application of continuous AC square wave fields at high voltages, without disruption of the texture. The details of the materials used and results obtained from this method are outlined below.

Three separate chiral nematic mixtures were prepared and tested:

Mixture 4: FFO11OCB+3.48% BDH1281 high twisting power chiral dopant (Merck NB-C)+5.84% reactive mesogenic monomer RM257 (Merck NB-C);

Mixture 5: [FFO9OFF+FFO11OFF] (50/50)+2% BDH1281+3% RM257 and;

Mixture 6: [FFE9EFF+FFE11EFF+FFO9OFF+FFO11OFF] (25/25/25/25)+1.78% BDH1281+4.36% RM257.

Figure 16:
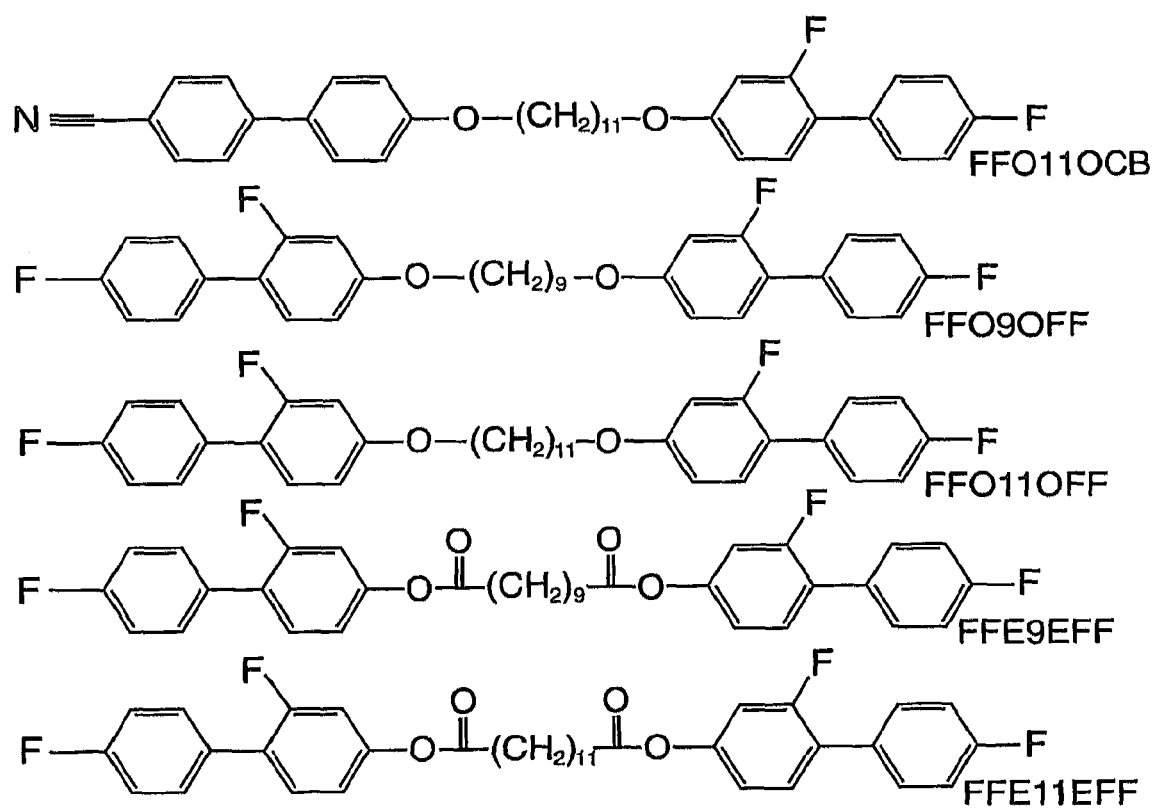
FIG. 16 gives the chemical structure of the five bimesogenic materials used to create three separate polymerised chiral nematic mixtures.

All percentages above are weight for weight. The bimesogenic materials used in these mixtures are referred to by their abbreviations, which correspond to the following chemicals: α-(2',4-difluorobiphenyl-4'-yloxy)-ω-(4-cyanobiphenyl-4'-yloxy)undecane (FFO11OCB); α-(2',4-difluorobiphenyl-4'-yloxy)-ω-(2,4-difluorobiphenyl-4'-yloxy)nonane (FFO9OFF); α-(2',4-difluorobiphenyl-4'-yloxy)-ω-(2',4-difluorobiphenyl-4'-yloxy)undecane (FFO11OFF); α-(2',4-difluorobiphenyl-4'-ester)-ω-(2',4-difluorobiphenyl-4'-ester)nonane (FFE9EFF) and α-(2',4-difluorobiphenyl-4'-ester)-ω-(2',4-difluorobiphenyl-4'-ester) undecane (FFE11EFF). The structures of the materials are shown in FIG. 16.

The cells were constructed as before, with the exception that both the cell and the lid, which consists of a 100 μm thick cover slip cleaved to fit the cell, were coated with an alignment layer to promote planar alignment of the liquid crystal at the cell surfaces. As the bulk electrodes prevent mechanical rubbing of a layer, a linearly photopolymerizable photopolymer (LPP) (Rolic inc), was spin coated onto the cell and lid, and the alignment direction induced by directional cross-linking with polarized UV light. This provided an alignment layer of sufficient quality without the need for physical contact with the cell surfaces. Once aligned, the lid was fixed to the cell by allowing UV curing glue to wet between the top surfaces of the bulk electrodes and lid via capillary action before curing. The cell gap was then measured using a Fabry-Perot interference technique. The cell could then be filled with a chiral nematic mixture, the desired Grandjean texture obtained and stabilized by UV exposure to cross-link the reactive mesogen.

The cells were placed in the same experimental apparatus as before, and subjected to continuous AC square wave voltages.

All mixtures were found to exhibit a frequency dependent field-following response: At low frequencies, the optic axis is free to tilt to its flexoelectrically induced value, where it remains until the field reverses polarity, at which point it switches across to the same value in the opposite direction. This manifests itself in the optical response as the field following component of the observed birefringence, which drops at the zero field crossover points.

Figure 17:
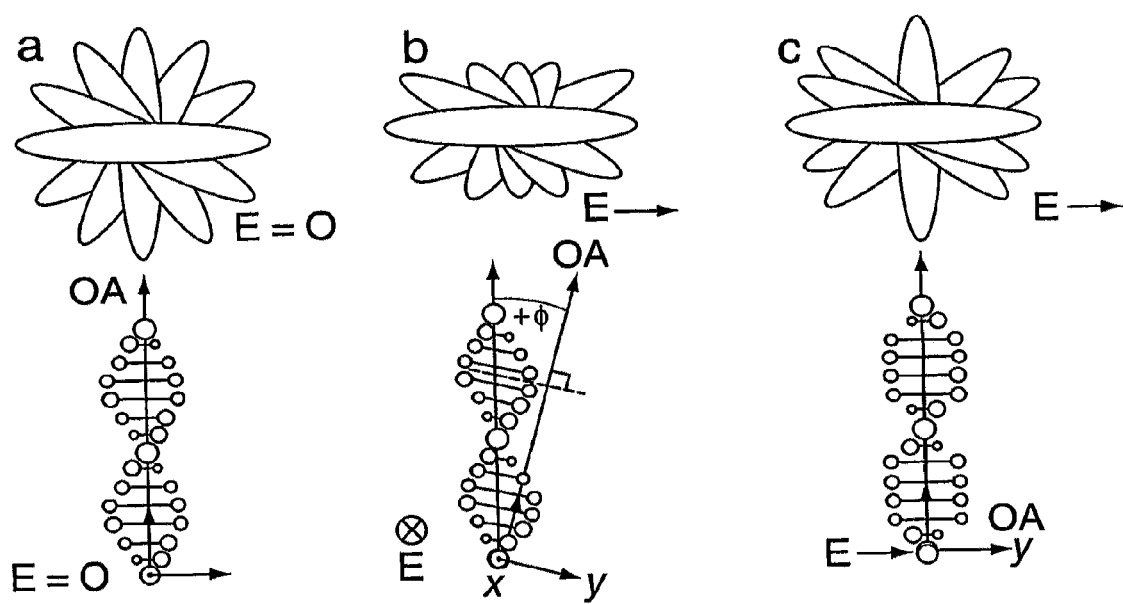
FIG. 17 is a schematic illustration of the deformation of the chiral nematic helical director structure (a) due to flexoelectro-optic (b) and dielectric (c) coupling to an electric field applied orthogonal to the helical axis.

The degree to which the response drops at these transitions is dependent on the extent to which dielectric helix unwinding produces a "baseline" birefringence which is constant over the field transition points, as discussed earlier. This baseline reveals itself in the high frequency (>2 kHz) traces, in which the flexoelectro-optic movement of the optic axis is too slow to follow the field oscillations. In this situation, the optic axis oscillates only slightly about the helix axis, and the observed birefringence is roughly constant over the a.c. waveform. The differing effects of the flexoelectro-optic and dielectric deformation on the chiral nematic helix structure resulting from the continuous square wave are illustrated in FIG. 17. This also shows how both deformations result in a similar birefringence, requiring the alteration of driving frequency to separate their effects. The effect of the deformation is viewed along (upper figure) and perpendicular (lower figure) to the helical axis to illustrate the source of the resulting birefringence. Note in the flexoelectric example the differing electric field direction for the two views, necessary for illustrative purposes.

Figure 18:
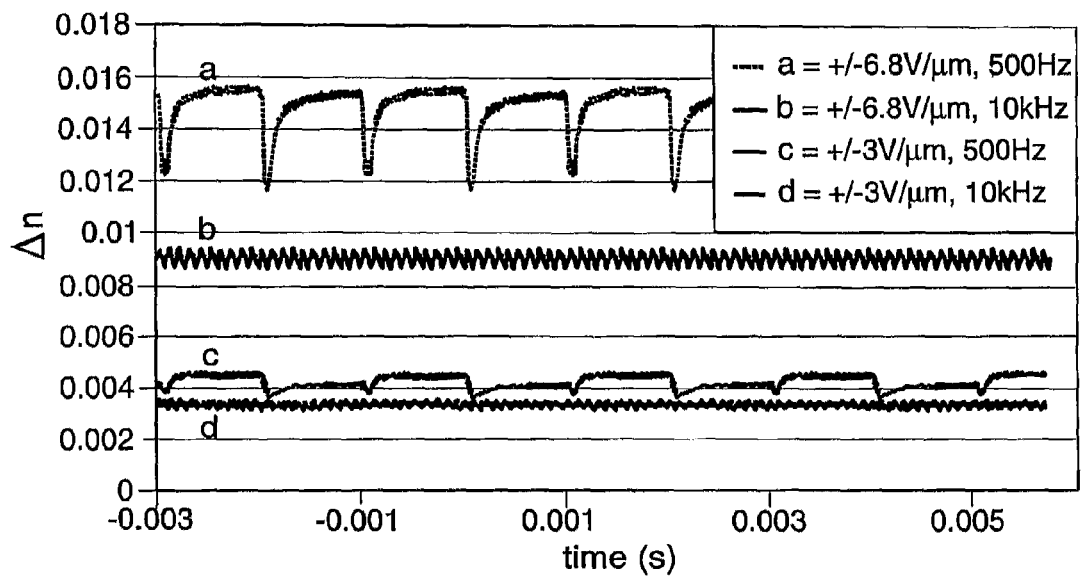
FIG. 18 shows the electric field induced birefringence at differing field amplitudes and frequencies for Mixture 4 at $T_c-10=118°$ C., ($T_c=128°$ C.)
Figure 19:
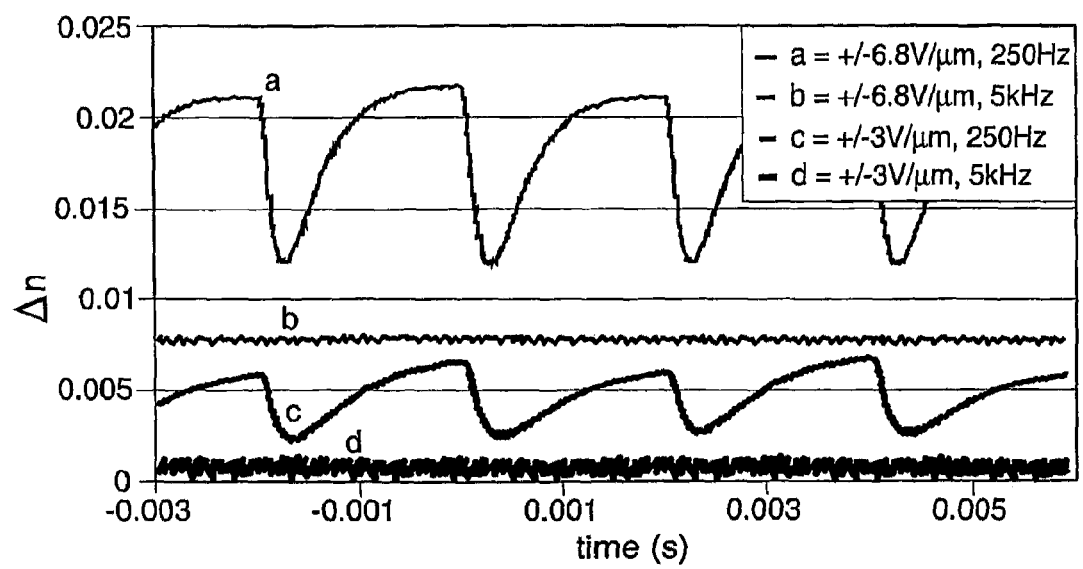
FIG. 19 shows the electric field induced birefringence at differing field amplitudes and frequencies for Mixture 5 at $T_c-10=56°$ C., ($T_c=66°$ C.)
Figure 20:
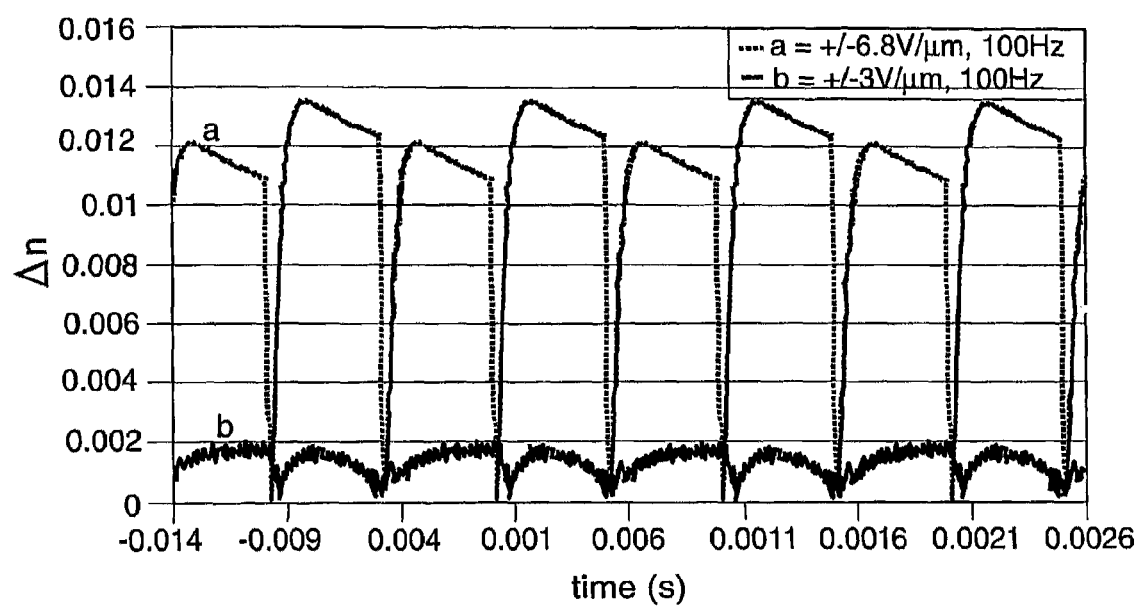
FIG. 20 shows the electric field induced birefringence at differing field amplitudes and frequencies for Mixture 6 at $T_c-10=59°$ C., ($T_c=69°$ C.)

The optical response to high and low frequency square waves for the three mixtures is shown in FIGS. 18 to 20.

Without wishing to be bound by theory, we believe that the reason the low frequency response does not drop all the way to the high frequency baseline at the zero field crossover points may be that the amplifier used is unable exactly to replicate the square waveform at high frequencies, resulting in a drop in the effective r.m.s field value. This belief is supported by the fact that the square wave can be seen to distort on the oscilloscope and, in the response from the third mixture, the characteristic dips in the low frequency response go all the way to zero birefringence. This also confirms that in this very low $\Delta\in$ material ($\Delta\in\approx 0.9$), dielectric coupling is insignificant and helix unwinding effects are eliminated.

In fact the three mixtures investigated show a good progression in terms of reduction of the dielectric baseline birefringence and increase in the flexoelectro-optic modulation at low frequencies, culminating in the entirely flexoelectro-optic response of the [FFE9EFF+FFE11EFF+FFO9OFF+FFO11OFF] (25/25/25/25)+1.78% BDH1281+4.36% RM257 mixture. The maximum flexoelectro-optic only based birefringence, observed in this cell, of 0.0135, is sufficient to provide half waveplate modulation in a 29 μm thick cell. Although this is large by conventional liquid crystal cell thickness standards, the bulk electrodes filling the cell and providing an in-plane field mean that increasing the optical path length does not necessitate an increase in electrode separation, so the usual problem of increased cell gap resulting in greatly increased response times in glass ITO coated planar cells does not apply. It is also believed there is considerable potential for fabrication of mixtures with increased birefringence in the infrared, using isothiocyanato based additives, allowing thinner cells to achieve the desired phase excursion. As the maximum applied field in the in-plane field cell was 6.8 V/μm, due to amplifier limits (i.e. 340 V at 10 kHz) and the 50 μm electrode aperture, the flexoelectro-optic tilt angles were not the maximum that could be achieved with these bimesogens, so this is another potential avenue for increased Δn.

Figure 21:
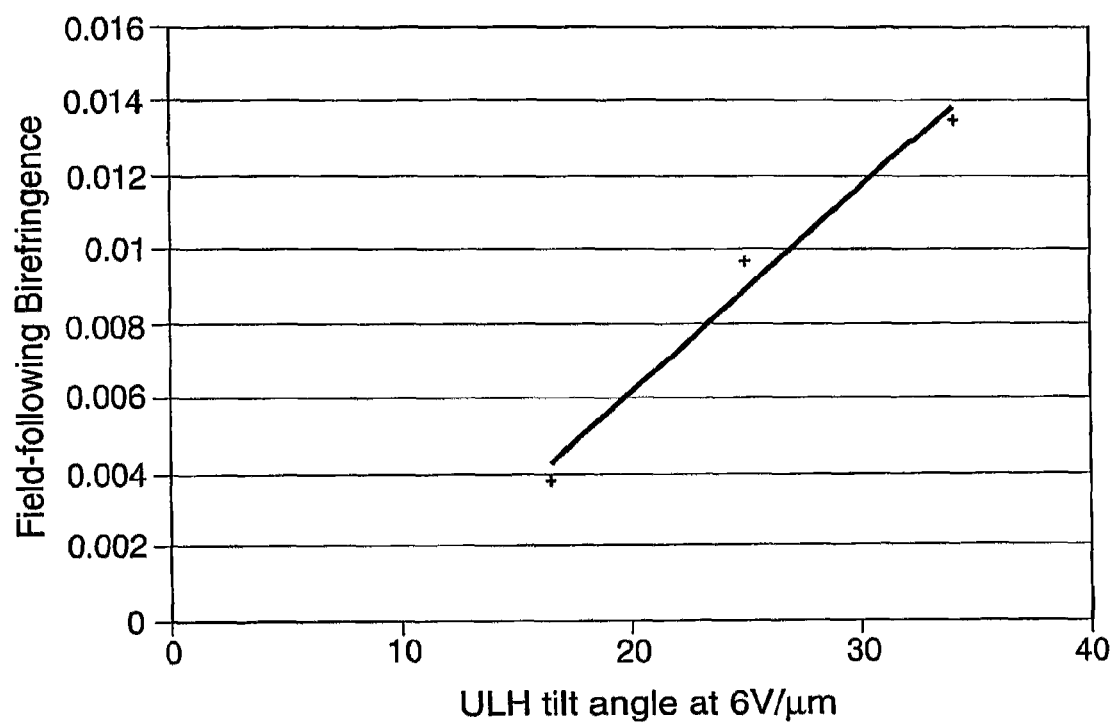
FIG. 21 shows the field-following (flexoelectrically induced) portion of the induced birefringence in the Grandjean textured cell, as a function of the flexoelectro-optic tilt angle measured in the uniform lying helix (ULH) texture, for the three mixtures at 6.8 V/μm.

The flexoelectro-optic tilt angles for each material were measured at 6.8 V/μm in the ULH textured cells. If the field following (flexoelectro-optic) component of the induced birefringence, which is simply the amplitude of the modulation in the "a" trace for each of FIGS. 18 to 20, is plotted against the flexoelectro-optic tilt angle in the ULH (FIG. 21), a good correlation is found, supporting the conclusion that the same flexoelectro-optic deformation is responsible for this portion of the effect. The trend shown in this figure can be seen to tend to zero birefringence for tilt angles of approximately 8 degrees or less. This can be thought of as a "threshold" tilt angle for an observable effect. The results in FIG. 21 illustrate that a material with larger tilt angle in the ULH texture does indeed exhibit a larger flexoelectrically induced birefringence in the grandjean device.

Also, if the response times for the 4 V/μm switch in each cell configuration are compared, for the same temperature and field strength, a good correlation is again observed, as shown in Table I below. It can be noted from the table that all the response times measured are sub-millisecond at $T_c$-10, significantly faster than the typical response of director reorientation in a typical nematic device, usually of the order of 10 ms. This shows promise for the intended outcome of a faster operating active waveplate as the final application.

TABLE I

|  | Mixture 1 | Mixture 2 | Mixture 3 |
|---|---|---|---|
| $T_c$ | 128° C. | 66° C. | 69° C. |
| Dielectric Anisotropy | 3.7 | 0.9 | 0.9 |
| ULH Cell flexoelectro-optic tilt angle (6.8 V/μm) | 16.5° | 25° | 34° |
| ULH Cell response time (4 V/μm) | 60 μs | 670 μs | 590 μs |
| Grandjean Cell response time (4 V/μm) | 120 μs | 810 μs | 560 μs |

It is also of note that the presence of a significant degree of dielectric coupling in the switch, as in mixture 1, did not adversely affect the response time, as can be seen in Table I.

Table I shows the averaged 10-90% and 90-10% response times observed in both the Grandjean textured in-plane field cell, and the ULH textured flexoelectro-optic cells. All times are measured at $T_c$-10°, for a switch from 0 V to 4 V/μm and back in the Grandjean case and from −4 to +4 V/μm and back in the ULH case.

In conclusion, a series of bimesogenic, short pitch, chiral nematic mixtures was made and tested for flexoelectro-optic effects at telecommunications wavelengths, i.e. 1550 nm. The materials were aligned in the Grandjean texture in cells designed to allow the application of in-plane electric fields. The observed response was found to be a combination of flexoelectro-optic and dielectric coupling effects. The relative contributions from these effects could be discerned by their differing dependence on the frequency of the applied field. The mixtures used, being designed to have very large flexoelectro-optic properties in the conventional uniform lying helix texture, allowed promotion of this effect over the dielectric contribution. The maximum field induced birefringence attributable solely to flexoelectric coupling, was 0.0135, and all mixtures showed response times below 1 millisecond. Both these measures show good potential for the mechanism to provide a faster active waveplate device.

It is appreciated that certain features of the invention which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention as set forth in the claims.

REFERENCES

1. Yamazaki H., Yamaguchi M., Optics Letters, 16, 18, p. 1415, 1991.
2. Crossland W. A., et al, *IEEE Journal of Lightwave Technology*, 18, 12, p. 1845, 2000.
3. Parker M. C., Cohen A. D., Mears R. J., *IEEE Journal of Lightwave Technology*, 16, 7, p. 1259, 1998.
4. Rumbaugh S. H., et al, *IEEE Journal of Lightwave Technology*, 8, 3, p. 459, 1990.
5. Ohtera Y., et al, *IEEE Photonics Technology Letters*, 8, 3, p. 390, 1996.
6. Chiba T., et al, *IEEE Journal of Lightwave Technology*, 17, 5, p. 885, 1999.
7. Meyer R. B., *Phys. Rev. Lett.*, 22, 18, p. 918, 1969.
8. Patel, J. S., Meyer, R. B., *Phys Rev Lett*, 58, 15, p. 1538, 1987.
9. Patel, J. S., Lee, S-D., *J. Appl. Phys*, 66, 4, p. 1879, 1989.
10. Coles H., "The Handbook of Liquid Crystals", Vol 2A, Chap 4, Wiley-VCH, 1998.
11. Dupont L., et al, *Optics Communications*, 176, p. 113, 2000.
12. Acharya B., et al, *App. Phys. Lett.*, 81, 27, p 5243, 2002.
13. Dupont L., et al, *Optics Communications*, 209, p. 101, 2002.
14. Musgrave, B., PhD Thesis, University of Southampton, 1999.
15. Coles H J., Musgrave B., *J. Mater. Chem.*, 11, p 2709, 2001.
16. GB 2 356 629.
17. WO 2004/021073.

The invention claimed is:

1. A device for controlling the polarization state of transmitted light, the device comprising:
    a cell and a light source arranged to direct polarized light through the cell along a light propagation direction;
    said cell comprising first and second cell walls enclosing a layer of a chiral nematic liquid crystal material having a helical axis oriented substantially parallel to said light propagation direction through the cell in the absence of an applied electric field;
    the cell further comprising electrodes for applying a transverse electric field substantially perpendicular to the said helical axis in the absence of an electric field;
    wherein the chiral nematic liquid crystal material has a helical pitch substantially shorter than the wavelength of light from the light source so that the bulk birefringence of the liquid crystal is substantially zero in the absence of an electric field.

2. A device according to claim 1, wherein the liquid crystal material has a helical pitch of less than about 1 μm.

3. A device according to claim 2, wherein the helical pitch is in the range 200-800 nm.

4. A device according to claim 1, wherein said electrodes comprise at least four electrodes arranged around a region of the liquid crystal layer, each electrode being selectively addressable to apply a transverse electric field across said region, whereby said electric field may be applied in any of a plurality of selectable directions substantially parallel to the inner surfaces of the cell walls.

5. A device according to claim 1, wherein said light source is arranged to direct light on said first cell wall in a direction substantially normal to the inner surfaces of the cell walls.

6. A device according to claim 1, wherein said light source is arranged to direct light onto a gap between the edge of the cell walls, substantially parallel to the inner surfaces of the cell walls.

7. A device according to claim 1, wherein said light source comprises an optical fibre coupled to a light emitter.

8. A device according to claim 7, wherein the light emitter will emit light having wavelengths in the range 200-2000 nm.

9. A device according to claim 8, wherein the light emitter will emit light having wavelengths in the range 1400-1600 nm.

10. A device according to claim 9, wherein the light emitter will emit light having wavelengths in the telecommunications range of about 1530-1563 nm.

11. A device according to claim 1, wherein said light source comprises a microwave emitter.

12. A device according to claim 1, further comprising a polymer network within the liquid crystal material, for stabilising a texture of the liquid crystal material.

13. A device according to claim 12, wherein said polymer network comprises 3-6% by weight of the layer of liquid crystal and polymer.

14. A device according to claim 12, wherein said polymer network comprises a polymerised mesogenic material.

15. A device according to claim 12, wherein said polymer is cross-linked.

16. A device according to claim 1, wherein the liquid crystal material is or contains a bimesogenic chiral nematic material of positive dielectric anisotropy.

17. A device or optical router according to claim 16, wherein said bismesogen is a-(2',4-difluorobiphenyl-4'-yloxy)-w-(4-cyanbiphenyl-4'-yloxy)nonane (FIG. 6).

18. An assembly for controlling the polarization state of transmitted light, comprising at least two devices as specified in claim 1 arranged on top of each other with all the cell walls substantially parallel to each other such that light propagating through the first device will subsequently propagate through the second.

19. A method of driving the assembly of claim 18, comprising applying substantially identical waveforms to electrodes of said devices, the waveforms being a quarter of a cycle out of phase with each other, and the shape of the waveforms being such that the sum of the induced birefringence in each of the devices is substantially constant.

20. A method according to claim 19, wherein the optic axes in said at least two devices are rotated together or counter to each other.

21. An optical router comprising the device of claim 1, and where:
    a) the cell comprising first and second cell walls enclosing a layer of liquid crystal material has a helical axis substantially parallel to the inner surfaces of the cell walls in the absence of an applied field, and where the electrodes comprise a plurality of electrodes arranged around a light-input region of the liquid crystal layer, each electrode being selectively addressable to apply a transverse electric field across said light-input region, whereby said electric field may be applied in any of a plurality of selectable directions substantially perpendicular to said helical axis;
    b) the light source is arranged to direct light through said light-input region in the gap between the side of the cell walls; and
    c) the optical router further comprises a plurality of light output carriers each of which is arranged and adapted to receive light from said light-input region via said cell gap when said light is of a specified state and/or direction of polarization, said specified state and/or direction being different for each light output carrier.

22. An optical router according to claim 21, wherein the liquid crystal material is a chiral nematic material having positive or negative dielectric anisotropy and having a helical pitch substantially shorter than the wavelength of light from the light input source.

23. An optical router according to claim 22, wherein the helical pitch is from 10% to 50% of the wavelength of light from the light input source.

24. An optical router according to claim 21, wherein the light from the light input source has a wavelength in the telecommunications range about 1530-1563 nm.

25. An optical router comprising:
    a) a cell comprising first and second cell walls enclosing a layer of a chiral nematic liquid crystal material of positive or negative dielectric anisotropy having a helical axis substantially normal to the inner surfaces of the cell walls in the absence of an applied electric field, and a plurality of electrodes arranged around a light-input region of the liquid crystal layer, each electrode being selectively addressable to apply a transverse electric field across said light-input region, whereby said electric field may be applied in any of a plurality of selectable directions substantially parallel to the inner surfaces of the cell walls in order to control the state and/or direction of polarization of transmitted light;
    b) a light source arranged to direct polarized light through said light-input region via said first cell wall along said light propagation direction; and
    c) a plurality of light output carriers each of which is arranged and adapted to receive light from said light-input region via said second cell wall when said light is of a specified state and/or direction of polarization, said specified state and/or direction being different for each light output carrier; wherein
    d) the helical pitch of the liquid crystal material is substantially shorter than the wavelength of light from the light source so that the bulk birefringence of the liquid crystal is substantially zero in the absence of an electric field.

26. An optical router according to claim 25, wherein the helical pitch is from 10% to 50% of the wavelength of light from the light input source.

27. An optical router according to claim 25, wherein the light from the light input source has a wavelength in the telecommunications range about 1530-1563 nm.

28. A method of controlling or modifying the polarization state of light propagating through a layer of a chiral nematic liquid crystal of positive dielectric anisotropy having a helical axis and sandwiched between substantially planar translucent cell walls, the light propagation direction being substantially parallel to the orientation of said helical axis in the absence of an electric field, the method comprising applying an electric field substantially perpendicular to the helical axis so as to distort the helical structure of the liquid crystal through flexoelectric coupling of the molecules of the liquid crystal material to the applied field, thereby changing the bulk birefringence of the liquid crystal; wherein the light has a wavelength in the near infrared, microwave or visible range, characterised in that the pitch of the helical structure is substantially less than said wavelength, so that the bulk birefringence of the liquid crystal is substantially zero in the absence of an electric field.

29. A method according to claim 28, wherein the helical axis is substantially normal to the plane of the cell walls.

30. A device for controlling the polarization state of transmitted light, the device comprising first and second cell walls enclosing a layer of a chiral liquid crystal material having a helical axis substantially parallel to the direction of light propagation through the device in the absence of an applied field, and electrodes for applying a transverse electric field substantially perpendicular to the said helical axis; wherein the liquid crystal material is or contains a bimesogenic chiral nematic material of positive dielectric anisotropy; and wherein said bismesogen is $\alpha$-(2',4-difluorobiphenyl-4'-yloxy)-$\omega$-(4-cyanobiphenyl-4'-yloxy)nonane (FIG. 6).

31. A method for driving an assembly for controlling the polarization state of transmitted light, comprising:
- providing an assembly of at least two devices for controlling the polarization state of transmitted light, each of the devices comprising:
  - first and second cell walls enclosing a layer of a chiral liquid crystal material having a helical axis substantially parallel to the direction of light propagation through the device in the absence of an applied field, and electrodes for applying a transverse electric field substantially perpendicular to the said helical axis,
  - where the two devices are arranged on top of each other with all the cell walls substantially parallel to each other such that light propagating through the first device will subsequently propagate through the second; and
- applying substantially identical waveforms to electrodes of said devices, the waveforms being a quarter of a cycle out of phase with each other, and the shape of the waveforms being such that the sum of the induced birefringence in each of the devices is substantially constant.

32. A method according to claim 31, wherein the optic axes in said at least two devices are rotated together or counter to each other.